United States Patent
Olshansky et al.

(10) Patent No.: US 7,346,043 B1
(45) Date of Patent: Mar. 18, 2008

(54) ALLOCATION OF CHANNEL CAPACITY IN MULTISERVICE NETWORKS

(75) Inventors: Robert Olshansky, Wayland, MA (US); James D. O'Brien, Somerville, MA (US); Robert Israel, Westford, MA (US); Harry Edward Mussman, Bedford, MA (US); David F. McGuigan, Sudbury, MA (US)

(73) Assignees: Verizon Corporate Services Group Inc., New York, NY (US); Level 3 Communications, LLC, Broomfield, CO (US); BBN Technologies Corp., Cambridge, MA (US)

( * ) Notice: Subject to any disclaimer, the term of this patent is extended or adjusted under 35 U.S.C. 154(b) by 908 days.

(21) Appl. No.: 10/158,771

(22) Filed: May 30, 2002

Related U.S. Application Data

(63) Continuation-in-part of application No. 09/452,915, filed on Dec. 1, 1999.

(51) Int. Cl.
*H04L 12/66* (2006.01)
(52) U.S. Cl. .................. 370/352; 370/230; 709/240
(58) Field of Classification Search .............. 709/240; 370/352, 230, 341; 455/445, 512
See application file for complete search history.

(56) References Cited

U.S. PATENT DOCUMENTS

| | | | |
|---|---|---|---|
| 5,889,846 A | 3/1999 | Ricciardi | |
| 6,091,709 A | 7/2000 | Harrison et al. | |
| 6,222,824 B1 * | 4/2001 | Marin et al. ............... | 370/230 |
| 6,304,565 B1 * | 10/2001 | Ramamurthy .............. | 370/352 |
| 6,363,079 B1 | 3/2002 | Barzegar et al. | |
| 6,363,424 B1 | 3/2002 | Douglas et al. | |
| 6,385,178 B1 | 5/2002 | Palvianen | |
| 6,519,249 B1 * | 2/2003 | Bennefeld et al. ......... | 370/352 |
| 6,625,119 B1 * | 9/2003 | Schuster et al. ........... | 370/230 |
| 6,795,867 B1 * | 9/2004 | Ma et al. ................... | 709/240 |
| 7,027,814 B1 * | 4/2006 | Koivupuro et al. ........ | 455/445 |

* cited by examiner

*Primary Examiner*—Chi Pham
*Assistant Examiner*—Albert T. Chou

(57) ABSTRACT

Methods are described which enable the operator of a network such as an Internet protocol (IP) network to allocate ingress and egress channel capacity for the use by different services or for use by different service providers. The methods can prevent a service provider or a service from overusing network capacity. The methods also enable the network operator to temporarily allocate unused capacity if demand for a service exceeds previously allocated capacity. Further a method is described whereby capacity on a Voice over Internet protocol (VoIP) network is sold to service providers with guarantees for the number of available channels, where the channel capacity guarantees could be global, or by any type of subdivision. In addition to having a committed channel capacity, the service provider could be allowed to exceed the committed capacity whenever excess capacity is available on the network.

30 Claims, 3 Drawing Sheets

ALLOCATION OF CHANNEL CAPACITY IN MULTISERVICE NETWORKS

RELATED U.S. APPLICATION(S)

This application is a continuation-in-part of U.S. patent application Ser. No. 09/452,915 filed Dec. 1, 1999 and currently co-pending. The disclosure of that application is herein incorporated by reference.

BACKGROUND OF THE INVENTION

1. Field of the Invention

This application relates to the field of capacity allocation on networks. More specifically, to the allocation of capacity on Internet protocol (IP) networks utilizing VoIP technology.

2. Description of Related Art

Communication services today are generally based on either the public switched telephone network (PSTN), which provides circuit-switched voice servers, real-time faxing, and central office (CO)-based voice mail, or the Internet protocol (IP)-based Internet, intranet, or extranet systems, which provide services such as e-mail.

The PSTN and the IP-based systems rely on different architectures and protocols. The PSTN refers to a collection of interconnected systems operated by the various telephone companies (telcos) and post telephone and telegraph administrations (PTTs) around the world. Although the PSTN was originally based on human-operated analog circuit switching systems, it has progressed through electromechanical switches, and has currently been made almost completely digital. As this change has progressed, however, the style of transmission has not changed. PSTN systems use dedicated circuits. That is, when a phone number is dialed, switches in the network lock-up a dedicated circuit that can only be used by that phone call and exist until that phone call is terminated. Thus, even when there is no information to carry as part of the transmission (e.g. the callers are silent) the circuit is still in use by the call.

IP networks work on a different principle. Instead of sending transmissions over a dedicated circuit, they packetize the transmissions with self-contained addresses that are then uploaded through a gateway into the network where they are relayed between routers until they reach their final destination. This packetization of transmissions allows for much more efficient transport of transmissions since empty space in a transmission (where no information is present) can be filled by additional transmissions. The problem with IP transmission, is that the packetization of data can lead to the degradation of voice and other transmissions that contain fairly constant streaming content and rely on high quality transport.

Voice over IP technology (VoIP) refers to technology allowing the signals generally broadcast over a PSTN network (such as, but not limited to, voice telephony, fax transmission, conference calling, voice mail, and similar transmissions) to be transmitted on an IP system using Internet protocol. More generally, VoIP is a method for packet-switch telephony. VoIP is now being used to build multiservice networks which bridge PSTN and IP-networks. Examples of such services are IP fax, messaging services such as unified messaging, Internet call managers, find-me-follow-me services, toll bypass long distance services, and PC telephony, all of which are gaining increasing acceptance and are becoming increasingly common.

As VoIP comes into increasing use, it also brings problems that were not present in the original PSTN system. One of these is the allocation of bandwidth on the IP-system. Traditionally, a service provider using PSTN would purchase a certain number of connections they were allowed to use. Since the PSTN network relied on dedicated connections, it was a simple matter to allocate a certain number of connections from the total available to any service provider. That service provider knew how many end-users they could have using the system at any time since they knew how many dedicated connections they could have. Each connection was a physical line would allow the connection to one individual, or to a certain limited number of individuals, using methods known in the art. When the lines are full, there is no way to accommodate additional end-users and another end-user attempting to use the lines will not be able to connect their call. This meant that a particular service provider could only use the number of connections they had acquired. A benefit of this system is that a network administrator could guarantee a service provider access to a specific number of connections and thereby guarantee the service provider could have that number of calls going on simultaneously. A service provider with too many simultaneous calls would lose those calls over this number of connections instead of taking connections guaranteed to another service provider.

In IP technology, there are no predetermined number of dedicated connections available for use by the service provider, instead there is a certain amount of bandwidth that can be shared. This lack of dedicated connections allows for efficient transmission of data across the network because the data can wait for available bandwidth and fill any available bandwidth, but it makes it difficult to handle VoIP network allocation to service providers. In particular, since there are no predefined connections, if additional end-users access the system resulting in more simultaneous calls than connections purchased by the service provider, those calls will still be able to connect and will take up the bandwidth allocated to another service provider. In an extreme case, this means that service providers can hog the bandwidth of other service providers preventing those other service providers from accessing the system they are supposed to have acquired rights to. Further, the hogging service provider may not have to pay any cost for its hogging, paying only for those connections it acquired. This ability of a service provider to use extra bandwidth means that a network administrator cannot guarantee a number of potential call connections making availability of the system unclear. To further aggravate the problem, the network administrator lacks an efficient method of monitoring an IP network for whether a particular service provider has additional end-users using additional connections because there are no set connections to monitor. Therefore, a service provider hogging the system may not even be aware of their overuse and have no indication that they should purchase additional capacity.

To prevent this problem, many VoIP systems have turned to monitoring by minutes of use instead of by calls or transmissions. This can be an effective way to prevent failure to pay for the network use actually used, but still does not allow the network administrator to guarantee the availability of connections to any particular service provider at any particular time or to prevent a service provider from hogging the network. This method merely insures that the service providers are charged for the additional services they use. This method is also problematic because it is unintuitive. VoIP systems handle calls and other traditional PSTN services which have always been measured in terms of number of calls and connections used. In order to compute needed minutes, service providers need to come up with new allocation systems to insure purchase of sufficient allocation.

To be able to guarantee a certain amount of call capacity to a particular service provider, a network administrator could allocate call capacity for different purposes by reserving dedicated access circuit capacity between the PSTN and the VoIP gateways for each service or for each service provider. This is a very inefficient way to allocate bandwidth, because it means that there is a dedicated access network for each service provider and the network administrator effectively recreates the system of the PSTN physical line limitations. To put it another way, the system has dedicated connections for use by each of the subscribers. Although this solves the above allocation problem, it also eliminates the benefits of VoIP technology. It does not allow the transfer of additional requirements to available additional resources.

The use of dedicated access circuits further results in a very costly and inefficient network. It could require allocating additional capacity to a service or for a service provider only by physically adding circuit capacity or changing gateway configuration to shift capacity from one service to another. This eliminates a further benefit of the IP network where all services and all service providers can share the same access network and the network itself is able to allocate capacity for different purposes in real-time without reconfiguring equipment or rearranging circuits.

It is therefore desirable in the art to have a method to allocate the use of connections in a way similar to that accomplished by the physical separation of lines, while at the same time, allowing capacity to utilize unused resources, allow quick modification of existing service provider capacities, and generally utilize the benefits of IP-networks. Both the avoidance of overuse and hogging of network resources and the availability of idle lines to be used for otherwise missed calls can allow the network to be allocated more efficiently.

SUMMARY OF THE INVENTION

In the present invention, a network administrator is able to reserve channel capacity for each service and each service provider related to the allocation of channels corresponding to traditional connections. In addition to reserving capacity, this invention can also allow the network operator to allocate unused capacity in real-time according to various rules or algorithms which provide for efficient utilization of network capacity, and further to record when transmissions through the system are either turned away or allocated to channels not included in a particular service provider's prior allocation of channels. This enables efficient billing and information on when channel capacity needs to be increased at either the network administrator or service provider level.

Methods are described which enable the operator of an Internet protocol (IP) network to allocate ingress and egress channel capacity for the use by different services or for use by different service providers. The methods can prevent a service provider or a service from overusing network capacity. The methods can also enable the network operator to temporarily allocate unused capacity if demand for a service or by a service provider exceeds previously allocated capacity. The methods can also allow quick modification of the network to add capacity to a service or service provider. Further a method is described whereby capacity on a Voice over Internet Protocol (VoIP) network is sold to service providers with guarantees for the number of available channels, where the channel capacity guarantees could be global, or by any type of subdivision. In addition to having a committed channel capacity, the service provider could be allowed to exceed the committed capacity whenever excess capacity is available on the network.

In one embodiment, the invention comprises a method for allocating capacity on a network, generally a network with PSTN and/or IP component networks. The method includes providing an access point, such as a gateway and gatekeeper type system, or a network or hierarchy of gatekeepers through which transmissions along the network may be transferred, and a predefined number of channels to which the transmissions may be assigned, subsequent to said access point. The method also includes directing a transmission to the access point and subsequently determining if there is available an unassigned channel; allocating the transmission to an available unassigned channel, and transferring the transmission through the access point.

In one embodiment of the invention, a service provider may also be provided to control the predefined number of channels, and to whom a predetermined number of transmissions currently using those channels are associated. The service provider then directs an additional transmission to the access point with the intention of passing it through the access point using an available unassigned channel. The transmission can be permitted to move along the remainder of the network, or the transmission can be rejected and a record can be made of the rejected transmission. In one embodiment the record is made by using a recording channel which records the rejection of transmissions.

In a further embodiment of the invention, the allocation of a transmission can be done by allocating the transmission to an available unassigned channel in the predetermined number of channels if one is available, or calculating whether there is an available unassigned channel on the network but not included in the predefined number of channels and allocating the transmission to the available unassigned channel not included in the predefined number of channels assigned to a service provider.

DETAILED DESCRIPTION OF THE PREFERRED EMBODIMENT(S)

Figure 1:
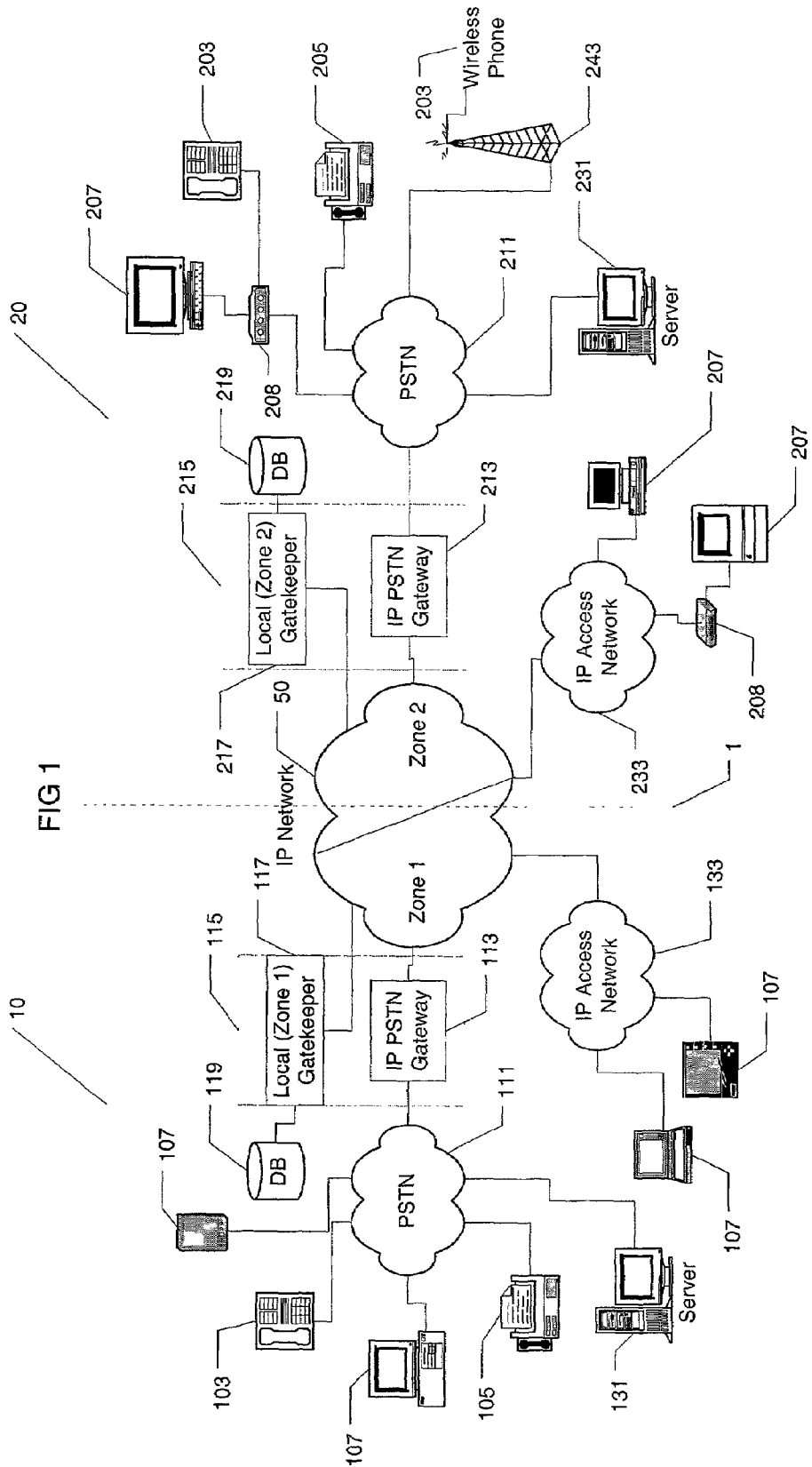
FIG. 1 shows a network showing a simplified layout of one embodiment of the instant invention adapted for the transfer of voice telephony.

This description will be primarily directed to the use of a gateway and gatekeeper making up an access point, and the transmission, using VoIP technology, of a traditional phone call (voice telephony) over a PSTN network and IP network of the type used in the United States. It would be understood by one of skill in the art that the functions described could be implemented by alternative access points. Alternatively, transmissions other than voice such as facsimile, electronic messaging, paging, or other data, or signals could be controlled by the same technology. The use of the term "call" is used to refer to voice telephony but a call could refer to any type of transmission. The same methods could be used for non-IP networks such as ATM networks to carry voice or other transmissions between the PSTN and/or other endpoints. The system and method could also be used over networks in other countries which may or may not be similar type PSTN networks or IP networks as those in the United States.

As used herein, the following terms generally encompass the following meanings although these definitions are not intended to limit the plain meaning of any term as would be understood by one who is skilled in the art.

"VoIP" will generally be used to refer to the Voice over Internet Protocol technology for sending voice signals over the Internet, or via lines generally used for the transfer of data as opposed to the transfer of voice. VoIP can, however, encompass any type of technology for transferring the type of information normally available on a PSTN network over an IP network or the transferring of transmissions traditionally having dedicated connections over networks utilizing packet transmission. The term VoIP will be used to include the technology of FoIP or FAX over Internet Protocol.

"Transmission" will generally refer to a particular portion of information that can be grouped into a discrete transmission. A transmission could refer to, but is not limited to, a phone call or portion of a phone call (such as the spoken words between consecutive silences), a discrete portion of data (such as a web page, or portion of a web page such as a graphic), a fax transmission or portion of a fax transmission (such as a black portion of a page separated by white portions from other black portions of a page), any other type of transmission as would be readily understood by one of skill in the art, or any of the previous in any combination.

"Channel" will generally refer to an indication of representative capacity of a network to carry a transmission. That is, any network can carry a certain number of transmissions and the number of channels on the network can represent that number of transmissions. Here, a channel will generally be a computer construct representing a single DS-0 channel on an IP-network. Such construction is not required, however, and a channel could be multiple DS-0 channels or any other sized construct.

"Network administrator" will generally be used to refer to any entity operating at least a part of a network. A network administrator will generally sell availability of a network to a service provider, but need not do so. A network administrator can also be a service provider and/or end-user.

"Service" or "service provider" will generally refer to a communications company, voicemail, messaging, fax, or similar service or service provider. A service provider may be associated with a particular service or a service may not have a clearly defined service provider or a service provider may provide multiple services, or a service may be provided by multiple service providers. Regardless of these possible relationships, the two phrases will be used interchangeably to represent any entity desiring to have information and transmissions carried over the network controlled by the network administrator. A service provider may also be a network administrator or an end-user.

"End-user" will generally refer to the entities who are actually generating a transmission to be carried over the network. This can be a person carrying out a phone call or any other type of entity participating in a transmission. An end-user can also be a service provider or a network administrator.

FIG. 1 shows a network (1) in accordance with one embodiment of the invention. FIG. 1 is primarily concerned with transferring voice telephony, or PC telephony between two separate users. The left side of FIG. 1 will generally be referred to as the calling side (10), where a transmission originates. The right side of FIG. 1 will generally be referred to as the receiving side (20), where a transmission is received. A caller on the calling side (10), using an embodiment of the system of the current invention, will connect via, for example, a telephone (103), a fax machine (105), a computing device (107), a server (including an application server (131)), or a similar device. These devices are capable of being connected to a caller's local area of the PSTN network (111) to connect with a second user operating, for example, either a telephone (203), a fax machine (205), a computing device (207), a server (including an application server (231)), or a similar device. This connection can be direct, or can be through another structure outside the PSTN network. Depicted are a calling side IP access network (133) and receiving side IP access network (233). These could be cable TV networks, DSL networks, T1, T3, ATM, or frame relay access networks, or any other type of network allowing access to the IP network. The calling side IP access network (133) and receiving side access network (233) are depicted as separate in FIG. 1 but they could be the same network or connected in another embodiment of the invention. There could also be other networks such as, but not limited to a modem (208), a cellular or other wireless phone, (203) and associated wireless system (243) communications device, or communications network, an Ethernet or other network, or a network router or similar device.

In accordance with one embodiment of the invention, the system may be configured to permit a transmission involving at least one computing device (either 107 or 207) as caller or receiver. Such a system may be required by U.S. regulation in order to access an IP network. Absent such regulation, however, it would be easily understood that the system could communicate between devices that are non-computing, instead of involving a computing device.

The device used by the caller may be attached to the caller's local area of the PSTN (111) in any manner appropriate for the device used by the caller. Such attachment can be by a wired system, an infrared (IR) system, a radio frequency (RF) system, or through another system adapted to convert signals (for example, from a cellular phone) into signals understood and carried by the caller's local area of the PSTN (111), as is well known to the art. It should be appreciated that the PSTN is generally thought of as comprising one network encompassing the phone system of the world. The term PSTN refers to a web of connections which can range from the individual phone lines for private phones, to enormous trunk lines that connect a large number of devices. Each device will, however, be connected to a local portion of the PSTN network web. In the case of a land line device, this will be based on the location of the device and its physical connection. With regards to mobile phones or other wireless devices, however, the local area may be represented by the location the phone is currently in, even if the phone is outside its traditional "local" area. The term local area of the PSTN will therefore refer to the area that connects to the phone and where the phone can be located for the purposes of transferring a call to or from that particular phone. Such systems are well known to the art. This area can be a small local area, or any area of size less than the entire PSTN network. It is also possible that both the caller and receiver of any given transmission are both on the same local area of the PSTN. The caller's local area of the PSTN (111) connects to the IP network (50) through a calling side access point (115) containing a calling side VoIP gateway (113) and an ingress gatekeeper (or call agent) (117). This connection may not be "local" to the caller and may be from any portion of the PSTN that eventually connects to the caller's phone and not necessarily from the portion of the PSTN intended to be the caller's local area of the PSTN (111). However, for the purpose of illustration, it is reasonable to show the caller's local area of the PSTN (111) connecting to the IP network (50). The PSTN can connect to the IP network (50) at any point, as would be understood by one of skill in the art, and still be within the scope of the invention. The calling side access point (115) can be of any type related to the location and type of device used by the caller and/or the service provider to allow the caller to connect to the IP network from the PSTN network. As discussed below, the access point need not contain a gateway and/or a gatekeeper and need not be able to connect to a PSTN network. The calling side VoIP gateway (113) may be of any type designed to facilitate the communication between the PSTN and IP networks and will generally carry out all necessary code and protocol conversion to place a transmission formatted for use on a PSTN network into a transmission formatted for use on an IP network. In one embodiment of the invention, the calling side access point (115) connects on one side to the caller's local area of the PSTN (111) through Primary Rate Interfaces (PRIs), channelized T1 circuits, or intermachine trunks (IMTs), and on the other side to the IP network (50) through a Local Area Network (LAN) and an IP router. The IP network (50) may be any type of IP network including, but not limited to, an IP backbone network, an IP access network, or a third-party IP network. The above described configuration is also not required for connection, as would be understood by one of skill in the art, and all other appropriate connections are included within the scope of this disclosure.

The IP network (50) generally can carry VoIP traffic between access points in addition to other IP traffic. The IP network (50) can be part of a network operator's IP backbone network which carries other data traffic, can be a system designed to carry only VoIP traffic, can be designed to carry only VoIP traffic using the system of the invention, or can be another design as would be understood by one of skill in the art.

The IP network (50) will generally pass the caller's transmission until it reaches the receiving side access point (215) containing a receiving side VoIP gateway (213) and egress gatekeeper (217) which connects to the receiver's local area of the PSTN network (211). From the receiver's local area of the PSTN (211) the transmission can be connected to the receiver's device attached to the receiver's local area of the PSTN (211). The connections between, and description of, the individual parts of the receiving side (20) can be any of the type previously discussed for the calling side (10) and in one embodiment will be of the same type to those on the calling side (10). It should be readily apparent from FIG. 1 that the calling side (10) and the receiving side (20) are similar and it would be possible for a call to be sent from the receiving side to the calling side. In addition, it is possible for calls to be connected simultaneously in both directions.

In order to pass PSTN transmissions on and/or off an IP network, in the depicted embodiment of the invention a gatekeeper is used. A gatekeeper manages call routing for gateways. In one embodiment of the invention, there is a single gatekeeper for each gateway connected to the network but such design is not necessary and in an alternative embodiment one gatekeeper serves many gateways. The gatekeeper controls the passage of the transmissions on and off the system and generally carries out the activities of insuring that a transmission gets off the PSTN through the calling side VoIP gateway (113) at the caller's local area of the PSTN (111) and back on through the receiving side VoIP gateway (213) at the receiver's local area of the PSTN (211).

Figure 2:
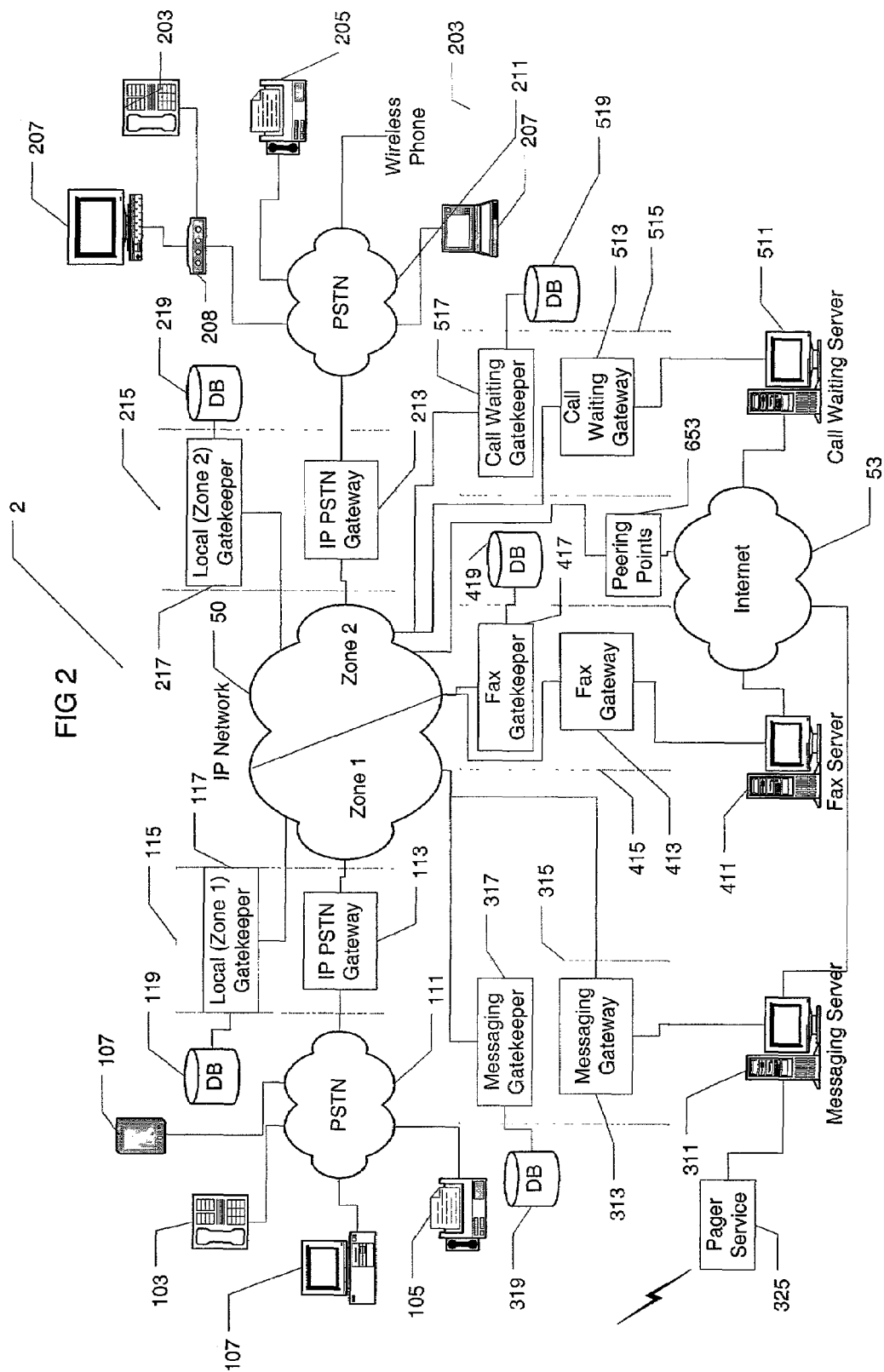
FIG. 2 shows a more complex layout of one embodiment of the instant invention including multiple applications.

From the caller's local area of the PSTN (111), there is an ingress gatekeeper (117) which controls the zone of the ingress (calling side) gateway (113). There is also an egress gatekeeper (217) which controls the zone of the egress (receiving side) endpoint. Here the egress endpoint is depicted as receiving side gateway (213) onto the receiver's local area of the PSTN (211) but in other embodiment's of the invention the egress could be an application server, another gateway, or a customer endpoint such as a personal computer or telephone. Examples of such endpoints are shown in FIG. 2. The ingress gatekeeper (117) can be attached to an ingress gatekeeper database (119) which can be used to store the capacity information as described below. Similarly egress gatekeeper (217) can be attached to an egress gatekeeper database (219). Although the gatekeepers are shown in FIG. 1 and FIG. 2 as being physically co-located with the associated gateway, such a layout is not required and the gatekeepers could be located anywhere on the network.

Gatekeepers (such as 117 and 217) are generally used to determine the path of the communication from the calling side gateway (113) to the receiving side gateway (213). In one embodiment of the invention, the gatekeeper comprises an H.323 entity that provides address translation and control access for terminals and gateways. The gatekeeper may also provide additional or alternative services to the terminals and gateways and/or can utilize a standard other than H.323 such as MGCP or SIP as would be known to the art.

In a further embodiment of the invention there can be a hierarchy or network of gatekeepers. This network or hierarchy can have a set structure or can be flexible and malleable depending on the type of transmission received. In one example of a hierarchy, gatekeepers could comprise an ingress gatekeeper that queries a route server gatekeeper which does the database lookup. The route server gatekeeper could be connected to a plurality of ingress gatekeepers, or the relationship could be one to one, or many route server gatekeepers could be connected to one ingress gatekeeper. This layout allows for segregation of tasks in that lower tier gatekeepers (such as the ingress gatekeeper) can perform call routing while the second tier gatekeepers can perform the necessary database lookups.

FIG. 2 shows a second layout of a network (2) of the instant invention. This layout includes all the components of FIG. 1 but further includes additional access points connecting to additional types of servers (in particular application servers). These types of servers correspond to some of the other services available to VoIP technology where voice is used in addition to data. These servers are not connected to the PSTN but instead are connected directly to the IP network through access points. In this case the access points and associated gateways do not connect IP protocol to PSTN protocol, but connect the IP protocol to a machine. Many of these services relate to the ability to transfer communication from one type of device (such as a phone), to a different type of device (such as a computer) when these devices are all interconnected. There is a messaging server (311) corresponding to unified messaging services. The messaging server (311) can be connected to a pager service (325) for transferring messages to a pager. Associated with the messaging server is an associated messaging gateway (313) and messaging gatekeeper (317) on a messaging access point (315). The messaging gateway (313) can connect to the messaging server over PRI circuits. In another embodiment of the invention the messaging gateway is not required and the messaging server can receive voip packets directly from the IP network (50). The messaging gatekeeper (317) can have an attached messaging gatekeeper database (319) for providing monitoring as discussed below. The messaging server (311) is shown attached to the Internet (53) in addition to the IP network (50). Although the Internet (53) can be carried on the IP network (50) it is possible in one embodiment of the invention to have the two networks be physically or conceptually separate. It may be desirable to have a peering point (653) which allows the IP network (50) to observe and interact with what is occurring on the Internet and/or vice-versa. In addition to the Internet (53), any of the servers depicted, any of the End-User access devices, or any other type of server, could be connected to any intranet system, extranet system, or any other type of network known to the art. Any of these networks could also have peering points connecting them to any other network.

Also shown in FIG. 2 is a fax server (411) for performing fax transmission over a computer as is known to the art. The fax server is also connected to the Internet (53), and is connected to the IP network (50) through a fax access point (415) including a fax gateway (413) and fax gatekeeper (417) with attached fax database (419). The fax gateway (413) can connect to the fax server over PRI circuits. In another embodiment of the invention the fax gateway is not required and the messaging server can receive foip packets directly from the IP network (50). These components operate similarly to the components of other servers.

FIG. 2 further shows a call waiting server (511) for providing call waiting services over a computer which has similar associated devices including call waiting access point (515), call waiting gateway (513) call waiting gatekeeper (517) and call waiting database (519). The call waiting gateway (513) can connect to the call waiting server over PRI circuits. In another embodiment of the invention the call waiting gateway is not required and the call waiting server can receive voip packets directly from the IP network (50). It would be understood to one of skill in the art that the components of these three systems can operate similarly to those attached to the PSTN voice networks shown alone in FIG. 1. Therefore, any discussion of components in the voice context of FIG. 1 could be applied to the components only pictured in FIG. 2. Similarly access points, gateways, and gatekeepers can all be of similar type so any discussion of the activities which could take place in any access point, gateway, or gatekeeper can be freely transferred to any other access point, gateway, or gatekeeper. Further, the components in FIG. 2 are far from exhaustive and new application server types, servers, and services which could be connected to the network via the method of the invention are being created regularly. Therefore, FIG. 2 should be taken as a sample showing some of the possible connections and not as an exhaustive list.

The passing of the connection to and from the IP network (50) through the ingress or egress gateways can be accomplished by a variety of means but commonly the PRIs or T1 circuits connecting the local area of the PSTN (either 111 or 211) to the IP network (50) are organized into hunt groups which provide local access to local calling areas or sets of local areas of the PSTN. Hunt groups will generally be defined by the use of blocks of direct-inward-dial (DiD) telephone numbers which can be assigned to different services or different service providers. The hunt groups will usually define a rough geographical area, a specific service provider, a specific type of user (for instance cellular users), a specific type of service, a chosen subset of the above, or some other logical combination of individuals. Each of the service providers that have acquired numbers within a hunt group will probably desire to have some access to the IP network that will depend on how many of their customers will be using the numbers they have assigned.

To understand a hunt group and how it is used it is best to look at an example. Assume that the two number blocks 781-262-1000 through 781-262-1999 and 781-262-3000 through 781-262-3999 are assigned to a hunt group and serve a local calling area in Eastern Massachusetts. The hunt group could comprise just these number blocks or could alternatively comprise additional numbers but for purpose of example contains only these numbers. Assume further that three service providers A, B and C want capacity on the network and blocks of the available DiDs are assigned to each such that Provider A has numbers 781-262-1000 through 781-262-1499, Provider B has numbers 781-262-1500 through 781-262-1999, Provider C has numbers 781-262-3000 through 781-262-3199, and numbers 781-262-3200 through 781-262-3999 are reserved for future expansion. Similar assignments are made in every local calling area served by that hunt group, if the hunt group is bigger than a single local calling area, and for every hunt group and every Local Access Transport Area (LATA) served by the multiservice network.

According to the present invention, the network operator can guarantee ingress channel capacity for each service provider by using the hunt groups and control at the access point. This is accomplished by assigning a predetermined number of channels to a hunt group where a channel corresponds to a single connection or a single call. Each channel therefore corresponds to a concurrent call channel. A concurrent call can require different amounts of Internet bandwidth according to which type of voice codec is used to encode the voice stream, e.g. G.711 requires 80 kbps, G.729 requires approximately 24 kbps). Using concurrent call channels allows a classification of a packet-based network by number of voice or voice equivalent transmissions the network can carry (as opposed to number of minutes or packets). By assigning these channels, the system has found a proxy for a method of having specific dedicated connections. It is important to remember that a concurrent call channel does not need to physically exist as a dedicated connection, and a concurrent call channel can represent the resources needed to meet the requirements of a dedicated connection, but is not a dedicated connection. To show with an example, Service Provider A could be provided with channel capacity NA-xyz where NA equals the number of concurrent call channels allocated to Service Provider A for the hunt group xyz. The service provider will then assign each of these individual numbers in that hunt group to end-users to correspond to their phone lines.

Although this method allows for allocations of concurrent call channels representing connections and therefore individual calls or transmissions, it still does not prevent a service provider from using another service provider's allocated channels. Service Provider A has no way of knowing how many end-users will simultaneously attempt to access the network at any given time, in any given local calling area or hunt group. Service Provider A can have a calculation based on statistical usage, but that does not actually forecast any particular instant. It is desirable, therefore, that the network administrator have a method available which enables the administrator to reject incoming calls if they exceed the allocated capacity of Service Provider A, and, if accepted, would potentially deny access to another service or service provider which is not currently using its full allocated capacity. At the same time, if there is idle capacity on the network, it is desirable to make that capacity available on-demand to end-users, provided that on-demand allocation does not deny service to end-users from other providers whose traffic falls below their allocation. Further, Service Provider A and the network administrator would like to know if end-users are being turned away because of insufficient capacity so that Service Provider A or the network administrator can increase the number of channels it has available to improve service to end-users.

The channel allocation of the invention can allow such limitation or reallocation of calls when channel capacity has been met. The system can also record rejected (lost) or re-routed transmissions through the control and monitoring of ingress and egress channels. That is, the use of concurrent call channels can be recorded whenever a transmission goes on or off the IP network. In some embodiments of the invention, ingress channel allocation is controlled by either the ingress gatekeeper (117) or the egress gatekeeper (217). In further embodiments of the invention, egress channel allocation is controlled by either gatekeeper. In still further embodiments of the invention, both the ingress and egress channel allocation are monitored. In other embodiments a hierarchy or system of gatekeepers can also be used and monitored. Specific embodiments of the first type will be discussed first, followed by the embodiments of the next two types respectively, the third type (with multiple gatekeeper) is discussed briefly.

In one embodiment of the invention ingress channel allocation is controlled by configuring the ingress gatekeeper (117) to keep a real-time record for each hunt group of the number of calls in progress according to the type of call and service provider. In one embodiment of the invention, each record could be represented by a table like that shown in FIG. 3 identified by the hunt group identifier (1001) and each service provider using that hunt group represented by a row (1003 or 1004) in the table. This table will often be stored in a database attached to the gatekeeper allowing the gatekeeper to keep live track of the current channel use by any particular service provider (or in the database accessed by the appropriate database or databases in the network or hierarchy of gatekeepers). The columns (1005) in the table could comprise four columns to identify the DiD numbers or blocks of DiDs corresponding to a service or set of services offered by a service provider (1011), the identity of the service provider (1013), the channel allocation for that row (1015) and the channels currently in use (1017). These columns are not required and it would be recognized by one of skill in the art that any number of columns could be used representing any combination of fields including fields described above, fields not described above, a subset of the fields described, and/or any of the previous in any combination. Each time a channel is used for a transmission, the ingress gatekeeper could record that use in the appropriate table and can allow any call to proceed if the number of calls in progress is less than the channel allocation for that DiD or DiD block or set of DiD blocks. The routing could be used as follows. The network would begin in a steady state where a predetermined number of channels were allocated to a particular service provider and/or service. In addition, that same service provider and/or service would have a certain number of its end-users currently generating transmissions (currently talking on calls), these associated transmissions have been allocated to individual channels of that service provider and/or service. To use a numerical example, as shown in row one (1004) of FIG. 3, Service Provider A could have 100 channels, 80 of which are currently allocated to existing transmissions which Service Provider A's end-users are generating. A new transmission is now originated by another of the service provider's end-users. This transmission arrives at the access point to be transferred onto the IP-network. The gatekeeper looks up in the database and sees that Service Provider A has available unallocated channels (20 of them) so it allocates one of the available channels to the new transmission and transfers the transmission on to the IP network.

Figure 3:
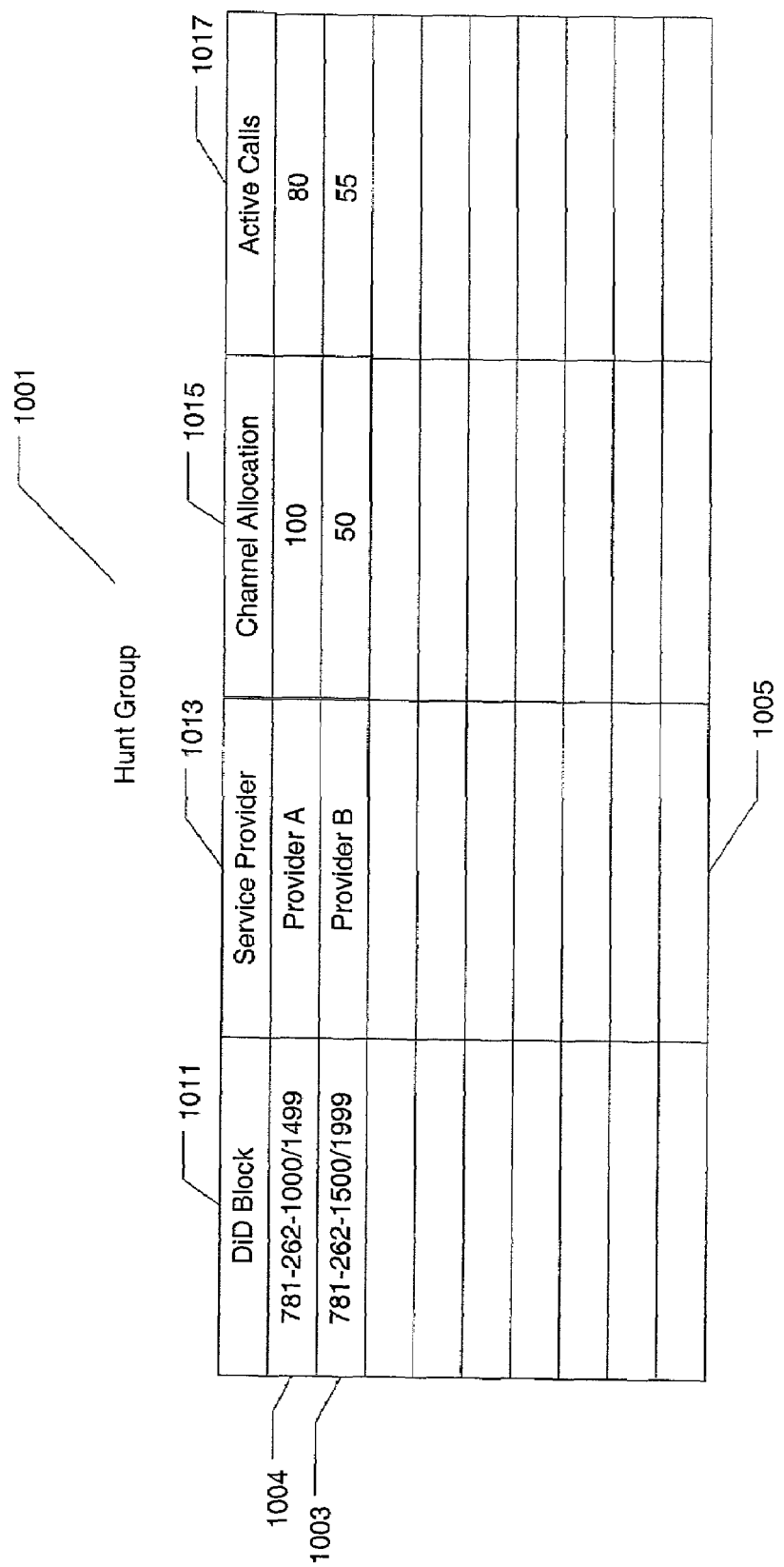
FIG. 3 shows a database table of the type used by one embodiment of the invention.

If the incoming transmission would cause the number of calls in progress for that entry to exceed the allocated capacity, (if the call has Service Provider A's one-hundred and first) the gatekeeper could use an algorithm to determine if the call should be allowed or rejected. Many different algorithms could be applied as would be understood by one of skill in the art. Such algorithms include, but are not limited to; always rejecting a call if it exceeded the allowed call capacity of the service provider; allowing the call if unused capacity exists on that hunt group, and that unused capacity is greater than X % of the total hunt group capacity; allowing the call if unused capacity exists on the hunt group and is greater than N unused channels; allowing the call if the service provider has not already used more than X % of the additional capacity; or allowing the call if the service provider has not already used more than N additional channels. These are only simple examples of rules for allocating unused capacity. Those skilled in the art will recognize that there are many alternative rules which could be adopted. The use of this algorithm permits a channel to be allocated that could not previously be used in a dedicated connection system. In FIG. 3 row two (1003) shows that Service Provider B has only 50 available channels yet has 55 channels in use. The reason is because Service Provider A (shown in row one (1004)) has only 80 of 100 channels in use meaning there is additional capacity on the network, a portion of which the algorithm allowed to be allocated to service provider B. Previously, the physical separation of connections would prevent this rapid allocation and reallocation of channels, with this system, however, since the channels are representative of the connections, channels can be allocated as needs arise, while still guaranteeing access. In addition, by carefully choosing the algorithm, no service provider could have an end-user denied a channel due to overuse by another service provider, while at the same time a service provider could have limited overuse. In a further embodiment of the invention, the network administrator could charge a premium rate for this overuse of the network allowing them to capitalize on the flexibility of the allocating system.

In another embodiment of the invention, ingress channel allocation is controlled by an egress gatekeeper. For example, a particular messaging service might be delivering incoming calls to a messaging server (311) or cluster of messaging servers within the local zone of a messaging gatekeeper (317), which would then correspond to the egress gatekeeper in this example. The egress gatekeeper would maintain a real-time record of all the calls in progress from each of the local areas served by that messaging server. That table could also contain a record of the channel allocated to that service for each local calling area served. If the incoming call would not cause the number of calls in progress for that local area to exceed the allocation, then the call would be allowed. If the incoming call would cause the number of calls in progress to exceed the allocation for that calling area, then an allocation algorithm, such as and including those described above, could be implemented.

The advantage of controlling the ingress channel allocation from the egress gatekeeper is that it provides more overall control for a particular service such as the messaging service above. Since the egress gatekeeper would typically not have information available concerning all calls in progress at a given local calling area, this method would be less effective in allocating unused capacity in any local calling area or hunt group as a whole. At the same time, it would be more effective in rejecting ingress calls that would be in excess of the capacity allocated to a specific service provider in a local area allowing the specific service or service provider to allocate among their available resources more efficiently. Once again a numerical example is appropriate. Let us assume Messaging Service M has 10 channels in 10 local areas, each of these has messages to be sent to the system server which can handle some number of incoming transmissions. In egress control, the egress gatekeeper can detect that all 10 channels in one area are in use while not all 10 channels in another are in use. The system can therefore accept a transmission from the second local area while not queuing a transmission on the first. This allows Messaging Service M to not go over the total channel capacity allocated to Messaging Service M.

In a further embodiment, both the above methods could be simultaneously used to most effectively allocate channel capacity on the ingress hunt groups, assure that there is accurate information to engineer the size of the hunt group, and effectively allocate overall utilization of the network by a particular service.

In some embodiments of the invention, primarily with ingress allocation control, it is desirable to have additional controls implemented when the system is forced to reject a call. These systems could notify end-users of why the call was rejected and monitor the rejection of calls for the monitoring of total network capacity and indications of when individual service providers, or the network administrator, will need to add additional capacity to their system.

On the service provider side, this monitoring will usually minimally comprise an announcement, perhaps customized to a service provider. The announcement would be used to help individual end-users deal properly with the overload condition, perhaps giving them an indication of when they should try again, or even an alternate number to try. This could be especially helpful if there was a temporary overload due to some specific condition such as a temporary network disabling of certain channels for maintenance. In addition, lost calls or use of channels allocated to another service provider could be recorded by the system to provide feedback to the services or service providers.

In a further embodiment of the invention, it is desirable to have a method for recording when a call is rejected because of a complete allocation of all channels in the hunt group. This information is particularly useful to network administrators since they can use a regular pattern of rejection of calls to increase their total channel capacity in the hunt group (such as by laying new lines) to better provide for customers.

When all circuits in a hunt group are busy, any additional calls are rejected by the PSTN carrier. Normally there would be no way to count the calls rejected during this time at the access point, and therefore no accurate way to understand how much the hunt group should be increased, or when the hunt group is in need of being increased. The network operator could have the PSTN carrier count rejected calls, but transferring that information in a timely manner to the network operator could be very difficult, if not impossible. The systems could be controlled by different administrators for example. Instead, a mechanism to solve this problem would be to keep at least one and probably a few channels generally idle in every hunt group. When all of the other circuits in a hunt group were in use (when the hunt group was completely allocated), these channels would be idle, and only then would any new calls from the PSTN be routed to these channels. These specialized recording channels would allow transmissions to be counted and categorized, and then rejected, perhaps with an announcement. Since this system allows "connection" with the calls before they are rejected, as opposed to the previous system that rejected the calls because of a lack of physical capacity, this system lets the network operator know in a very efficient and timely manner how many calls are being rejected, and thus allows the operator to accurately engineer any growth. As a specific implementation, using recording channels allows the transmission to enter the access point where it is recorded. In the prior systems, the transmission never entered the access point. If there are no channels available, the new transmission has conflict. It is much the way talking on a two-way radio prevents receiving. A similar system could be used for overuse by a particular service provider. An available channel controlled by another service provider could be temporarily used to record the existence of a transmission before rejecting the transmission if the algorithm determines there is insufficient capacity.

Instead of controlling inbound capacity and allocating inbound channels, it is desirable in some instances to control outbound capacity and to monitor and sell use of the system based on outbound capacity.

Services such as IP Fax (FoIP) or VoIP typically make many calls which terminate on the PSTN (as shown above in FIG. 2). For such a service it may be desirable to have an ingress gatekeeper controlling the zone for the fax server (411) or for the VoIP call server or proxy server (the fax gatekeeper (417)). That ingress gatekeeper could then keep records of all calls in progress for a particular service according to the destination numbering plan area (NPA or area code) or the NPA-NXX (which records both the area code and the central office code—the first 6 digits of a United States 10 digit phone number) of the calls. The ingress gatekeeper could reject calls if the volume exceeded an assigned capacity allocation for the network overall or for a particular destination NPA or set of NPAs. This system may be desirable for use with services where that service may have a large capacity of channels for ingress (for instance the fax access point (415) that only serves the particular fax service). If this fax service sent a large number of transmissions to a particular egress gateway, it could hold the line by not having its channel allocation counted on egress, and being within its allocation on ingress.

In some network arrangements, VoIP calls would egress through sets of gateways connected to an IntereXchange Carrier (IXC) providing service to a set of NPAs. The ingress gatekeeper could record the number of calls in progress terminated through that set of IXC gateways. If the number of calls exceed the capacity allocated for that service, the ingress gatekeeper could allow or block further calls. The IXC gateways could also fall within an egress gatekeeper's zone. The egress gatekeeper could also implement call allocation algorithms, recording all calls in progress according to the service, and assigning unused capacity according to algorithms, such as described above.

In addition to egress to IXC networks, VoIP calls can egress through trunk groups serving local calling areas. These local calling areas might correspond, but are not limited to, entire LATAs, entire NPAs, local calling areas subtended by LEC tandem switches, or local calling areas assigned to a specific end office or group of end offices. Gateways deployed in this way are referred to as local gateways and will register to a gatekeeper responsible for that zone. According to the method of this invention that egress gatekeeper could be configured to keep a real-time record of calls in progress according to the service type and to allow any calls which are within the allocated capacity, reject any calls in excess of the allocated capacity, or apply an algorithm as described above to determine whether to allow or reject calls.

In addition to using the egress gatekeeper to allocate capacity, it is clear that the ingress gatekeeper for any particular service could also be used to establish network-wide bounds on the number of allowed calls, or to establish bounds per NPA or set of NPAs.

In a still further embodiment of the invention, both egress and ingress control is used in ensuring no service provider can use channels either on or off the IP or PSTN network unless there is a channel unavailable to them. In this combined form, control by the network administrator can regulate connecting as was originally possible in the PSTN dedicated connection. In particular, there is a channel allocated to the transmission at start and end, that channel always being available and service being "dedicated". At the same time, benefits of the IP networks flexibility can still be taken advantage of allowing a more efficient transfer of transmissions.

A final benefit from the use of this invention can be the simplicity of altering the channels. Since the channels represent connections and are not physical connections (such as a cable or line), changing them merely requires alteration in the database or other structure at the access point to reflect a change in the number of channels. this makes changes occur virtually instantaneously.

The above described methods refer to ingress and egress to the PSTN. In other scenarios, a service provider can be providing VoIP, messaging or other services to an enterprise or to an ISP, where the VoIP calls are being delivered over an IP access link. These calls will originate or terminate on an IP gateway, application server, an IP-PBX, or other device with a H.323 interface. These are similar to those depicted as the three new services in FIG. 2. For some applications the service provider may desire to limit the number of calls on such a link, either to be able to insure the quality of service of the link, or because the customer has only purchased a specified call capacity. On these IP links, the number of calls on that link can be recorded by the gatekeeper responsible for that zone. The gatekeepers can then reject any calls which exceed the specified bound, or assign unused capacity according to algorithms, such as described above. The bound could refer to the total number of VoIP calls, to the ingress and egress calls, or separately to calls according to service type or service provider.

The methods described above pertain specifically to H.323 gatekeepers doing call routing for H.323 VoIP networks. It is clear that the same method can be applied to gatekeepers or call agents performing call control for MGCP or SIP networks or for any other type of protocol that can be used for routing VoIP transmissions.

While an embodiment has been described in which access points comprise gatekeepers or call agents that maintain real-time records of calls in progress and execute algorithms to determine whether calls can be accepted or rejected, in alternative embodiments other network control devices such as RADIUS servers used for call accounting, or CDR servers used for gathering call detail records could be used by the access point to control allocation. These servers have real-time access to all call routing information and could establish tables recording number of calls in progress according to service type, ingress or egress point, or service provider and could determine whether incoming calls can be authorized or not according to algorithm such as those described above.

In a still further embodiment of this invention, it is clear that dedicated servers could be established in the access point for the specific purpose of admission control of call attempts. These call admission severs would perform all of the record keeping functions and admission control decisions according to any of the methods described above.

A further embodiment of the invention extends to architectures where gatekeepers or call agents have access to a complete database of current resource allocation, so that all service guarantees can be enforced at the ingress gatekeeper or at the RADIUS servers. For example, the network could employ a centralized resource allocation controller (RAC), which contains a database of all of the service level guarantees along with a record of the current allocation of all resources on the network. Each ingress/egress gatekeeper or RADIUS server could keep the RAC notified in real-time of its current resource allocations, and consult the RAC before accepting any new call. The RAC would use this database to determine whether to accept or reject each incoming call based on the service level guarantees and the allocation algorithms. Note that in a carrier-class network any centralized resource control service may have to handle an impossibly large rate of call validation requests—hence a distributed resource allocation system may be more practical for real deployment.

It should also be clear that some of the mechanisms described could be implemented on a gateway alone, in such a manner that they could be effective over the scope of that gateway and that an access point lacking a gatekeeper could still perform the methods of the instant invention.

Using the system and method described above, a network operator can give the service provider guarantees (SLAs) of the availability of channel capacity for the overall network, by LATA, or by hunt group. If the demand for channels exceeds the guaranteed capacity, the network operator can enable the service provider to use excess capacity on the network. They can further charge a different rate to a service provider for allowing this temporary overuse. The rate could be a flat rate for any amount of overuse allowed by the algorithm, a per use charge related to the number of channels overused, or any other processing understood by one of skill in the art. These methods for selling capacity on networks is also included within the scope of this invention. In particular, the ability to provide set guarantees of channel capacity to a service provider and the ability to allow additional capacity to utilize underutilized groups of channels are included within the scope of this invention.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

The invention claimed is:

1. A method for allocating capacity on a network, said method comprising:

providing a network having an access point through which transmissions along the network may be transferred, and a predefined number of channels and a second number of channels subsequent to said access point, the predefined number of channels being allocated to a first service provider, the second number of channels being allocated to a second service provider, and the second number of channels being exclusive of said predefined number of channels;

directing a transmission associated with said first service provider to the access point;

determining if there is available an unassigned channel in the predefined number of channels, including comparing a number of existing transmissions associated with said first service provider to said predefined number of channels, there being an available unassigned channel if said predefined number of channels is greater than said number of existing transmissions associated with said first service provider;

allocating said transmission to said available unassigned channel and transferring said transmission through the access point if there is an unassigned channel in said predefined number of channels; and rejecting said transmission as it passes through the access point if there is not an unassigned channel in said predefined number of channels or said second number of channels, wherein said second service provider is associated with a plurality of existing transmissions from a plurality of end users.

2. The method of claim 1 further comprising permitting the transmission to move along a remainder of the network.

3. The method of claim 1, wherein the step of providing said network includes providing a PSTN network.

4. The method of claim 1, wherein the step of providing said network includes providing an IP network.

5. The method of claim 1, wherein the step of providing said network includes providing an IP network and a PSTN network.

6. The method of claim 1, wherein the step of providing said access point includes a gateway and a gatekeeper, said gateway providing access through said access point and said gatekeeper regulating passage of transmissions through said gateway.

7. The method of claim 6, wherein said step of determining is performed by said gatekeeper.

8. The method of claim 7, wherein in the step of providing said gatekeeper provides a gatekeeper operatively connected to a database.

9. The method of claim 8, wherein said gatekeeper is one of a network of gatekeepers.

10. The method of claim 8, wherein said determining is performed by maintaining in said database a record including a number of transmissions and a number of channels.

11. The method of claim 8, wherein said gatekeeper is one of a hierarchy of gatekeepers.

12. The method of claim 11, wherein said gatekeeper is on the highest tier of said hierarchy.

13. The method of claim 1, wherein in said step of rejecting, there is not an available unassigned channel if said service provider is already using X % of the unassigned channels in said second number of channels, X being any value between 0 and 100 inclusive.

14. The method of claim 1, wherein in said step of rejecting, there is not an available unassigned channel if said service provider is already using N channels of the unassigned channels in said second number of channels, N being any number greater than or equal to zero.

15. The method of claim 1 wherein said predefined number of channels and said second number of channels are controlled by a network operator.

16. The method of claim 1 wherein said transmission comprises a transmission from a device of the type including: a fax machine, a telephone, a server, an application server, and a computing device.

17. The method of claim 1 wherein said service provider is guaranteed to be able to have a number of transmissions directed equal to said predefined number of channels.

18. A method for allocating capacity on a network, said method comprising:

providing a network having an access point through which transmissions along the network may be transferred, a predefined first number of channels, and a second number of channels not included in said predefined first number of channels, the predefined first number of channels and the second number of channels being channels to which the transmissions may be assigned, subsequent to said access point;

directing a transmission to the access point;

calculating if there is available an unassigned channel in the second number of channels if there is no available channel in the predefined first number of channels;

allocating said transmission to said available unassigned channel; and transferring said transmission through the access point;

wherein a predetermined number of free channels that cannot be allocated are reserved in the second number of channels.

19. The method of claim 18, further comprising rejecting the transmission as it passes through the access point.

20. A method of providing a service provider capacity on a network, the method comprising:

having a network operator with a limited number of channels on a network;

allocating to a service provider a predefined number of channels on said network;

allowing said, network operator to direct transmissions from said service provider into said limited number of channels on said network;

comparing the number of transmissions from said service provider directed by said network operator to said predefined number of channels allocated to said service provider; and determining whether to allow a transmission into one of the limited number of channels based on said comparison, comprising transferring said transmission to an available unassigned channel in said predetermined number of channels, or calculating whether there is an available unassigned channel allocated to a second service provider on said network but not included in said predefined number of channels and directing said transmission to said available unassigned channel not included in said predefined number of channels, wherein said service provider is charged a special rate for using said available unassigned channel not included in said predefined number of channels, and wherein said second service provider is associated with a plurality of existing transmissions from a plurality of end users.

21. The method of claim 20 wherein said service provider is guaranteed to be able to have a number of transmissions directed equal to said predefined number of channels.

22. A method of providing a service provider capacity on a network, the method comprising:

having a network operator with a limited number of channels on a network;

allocating to a service provider a predefined number of channels on said network;

allowing said network operator to direct transmissions from said service provider into said limited number of channels on said network;

comparing the number of transmissions from said service provider directed by said network operator to said predefined number of channels allocated to said service provider; and determining whether to allow a transmission into one of said limited number of channels based on said comparison, comprising transferring said transmission to an available unassigned channel in said predetermined number of channels, or calculating whether there is an available unassigned channel allocated to a second service provider on said network but not included in said predefined number of channels and directing said transmission to said available unassigned channel not included in said predefined number of channels, wherein said step of calculating allows transferring of said transmission if there are at least a number N of unassigned channels, N being a number greater than or equal to zero, and wherein said second service provider is associated with a plurality of existing transmissions from a plurality of end users.

23. The method of claim 22 wherein said service provider is guaranteed to be able to have a number of transmissions directed equal to said predefined number of channels.

24. A method of providing a service provider capacity on a network, the method comprising:

having a network operator with a limited number of channels on a network;

allocating to a service provider a predefined number of channels on said network;

allowing said network operator to direct transmissions from said service provider into said limited number of channels on said network;

comparing the number of transmissions from said service provider directed by said network operator to said predefined number of channels allocated to said service provider; and determining whether to allow a transmission into one of the limited number of channels based on said comparison, comprising transferring said transmission to an available unassigned channel in said predetermined number of channels, or calculating whether there is an available unassigned channel on said network but not included in said predefined number of channels and directing said transmission to said available unassigned channel not included in said predefined number of channels, wherein said step of calculating allows transferring of said transmission if at least X % of a total number of channels are unassigned channels, X being any value between 0 and 100 inclusive.

25. The method of claim 24 wherein said service provider is guaranteed to be able to have a number of transmissions directed equal to said predefined number of channels.

26. A method of providing a service provider capacity on a network, the method comprising:

having a network operator with a limited number of channels on a network;

allocating to a service provider a predefined number of channels on said network, the service provider being distinct from the network operator;

allowing said network operator to direct transmissions from said service provider into said limited number of channels on said network;

comparing the number of transmissions from said service provider directed by said network operator to said predefined number of channels allocated to said service provider; and determining whether to allow a transmission into one of the limited number of channels based on said comparison, comprising transferring said transmission to an available unassigned channel in said predetermined number of channels, or calculating whether there is an available unassigned channel on said network but not included in said predefined number of channels and directing said transmission to said available unassigned channel not included in said predefined number of channels, wherein the step of calculating includes, giving to said service provider a number, N, there being an available unassigned channel if the number of transmissions from said service provider directed by said network operator to a channel not in said predetermined number of channels is less than N, N having any value greater than or equal to zero.

27. The method of claim 26 wherein said service provider is guaranteed to be able to have a number of transmissions directed equal to said predefined number of channels.

28. A method of providing a service provider capacity on a network, the method comprising:

having a network operator with a limited number of channels on a network;

allocating to a service provider a predefined number of channels on said network;

allowing said network operator to direct transmissions from said service provider into said limited number of channels on said network;

comparing the number of transmissions from said service provider directed by said network operator to said predefined number of channels allocated to said service provider; and determining whether to allow a transmission into one of the limited number of channels based on said comparison, comprising transferring said transmission to an available unassigned channel in said predetermined number of channels, or calculating whether there is an available unassigned channel on said network but not included in said predefined number of channels and directing said transmission to said available unassigned channel not included in said predefined number of channels, wherein the step of calculating includes, giving to said service provider a value X, there being an available unassigned channel if the number of transmissions from said service provider directed by said network operator to a channel not in said predetermined number of channels is less than X % of the number of unassigned channels, X having any value from 0 to 100 inclusive.

29. The method of claim 28 wherein said service provider is guaranteed to be able to have a number of transmissions directed equal to said predefined number of channels.

30. A method for allocating capacity on a network, said method comprising:

providing a network having an access point through which transmissions along the network may be transferred, a first number of channels, and a second number of channels not included in said first number of channels, wherein the first number of channels and the second number of channels are channels to which the transmissions may be assigned;

directing a transmission to the access point;

calculating if there is available an unassigned channel in the second number of channels if there is no available channel in the first number of channels;

allocating said transmission to said available unassigned channel; and transferring said transmission through the access point;

wherein a percentage of free channels that cannot be allocated are reserved in the second number of channels.

* * * * *